(12) United States Patent
Cavallaro et al.

(10) Patent No.: US 12,104,674 B1
(45) Date of Patent: Oct. 1, 2024

(54) SOFT-TO-HARD GOODS CONNECTIONS WITH DYNAMIC ENERGY DISSIPATION ENHANCED THROUGH FRICTION

(71) Applicant: The United States of America, as represented by the Secretary of the Navy, Newport, RI (US)

(72) Inventors: Paul V Cavallaro, Raynham, MA (US); Michael P Smith, Warwick, RI (US); Megan A Matson, Virginia Beach, VA (US); Christine C Schleicher, Virginia Beach, VA (US)

(73) Assignee: The Government of the United States of America as represented by the Secretary of the Navy

( * ) Notice: Subject to any disclaimer, the term of this patent is extended or adjusted under 35 U.S.C. 154(b) by 0 days.

(21) Appl. No.: 18/421,520

(22) Filed: Jan. 24, 2024

Related U.S. Application Data

(62) Division of application No. 17/313,218, filed on May 6, 2021, now Pat. No. 11,920,654.

(51) Int. Cl.
*F16F 9/00* (2006.01)
*E01D 15/20* (2006.01)
*F16F 9/32* (2006.01)

(52) U.S. Cl.
CPC ............... *F16F 9/32* (2013.01); *E01D 15/20* (2013.01); *F16F 2230/105* (2013.01)

(58) Field of Classification Search
None
See application file for complete search history.

(56) References Cited

U.S. PATENT DOCUMENTS

| | | | | |
|---|---|---|---|---|
| 3,796,356 A * | 3/1974 | Venus, Jr. | ........... | B65D 83/0061 222/386.5 |
| 4,085,865 A * | 4/1978 | Thompson | ........... | B67D 1/0462 222/1 |
| 4,386,929 A * | 6/1983 | Peery | ................... | A61M 5/152 222/211 |
| 4,741,733 A * | 5/1988 | Winchell | .............. | A61M 5/141 604/514 |
| 5,137,175 A * | 8/1992 | Kowalski | ............. | B67D 1/0462 222/105 |
| 5,934,618 A * | 8/1999 | Kari | ....................... | B64D 37/32 220/88.1 |
| 10,702,439 B1 * | 7/2020 | Cavallaro | .............. | A61G 17/06 |

* cited by examiner

*Primary Examiner* — Steven M Marsh
(74) *Attorney, Agent, or Firm* — James M. Kasischke; Michael P. Stanley; Jeffry C. Severson

(57) ABSTRACT

A soft-to-hard goods connector is provided which includes an elastomeric bladder having a preform layer and an outer textile layer enclosing the preform layer. The outer textile layer has at least one skin extension layer extending beyond a periphery of the elastomeric bladder. The skin extension layer has a chord attached at a distal end with the chord being perpendicular to the skin extension layer. The connector includes a host rigid structure with a receiving component. The receiving component has a mounting track with the chord mounted in the mounting track. The receiving component permits the chord to rotate about a longitudinal axis of the chord with a limited range of motion.

1 Claim, 13 Drawing Sheets

SOFT-TO-HARD GOODS CONNECTIONS WITH DYNAMIC ENERGY DISSIPATION ENHANCED THROUGH FRICTION

The present application is a divisional application and claims the benefit of the parent application entitled "Soft-To-Hard Goods Connections with Dynamic Energy Dissipation" filed on May 6, 2021 with U.S. patent application Ser. No. 17/313,218 by the applicants; Paul V. Cavallaro, Megan A. Matson, Christine C. Schleicher and Michael P. Smith.

CROSS REFERENCE TO OTHER PATENT APPLICATIONS

The present application is related to U.S. patent application Ser. No. 17/313,218 entitled "Soft-To-Hard Goods Connections with Dynamic Energy Dissipation" filed on May 6, 2021.

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

BACKGROUND OF THE INVENTION

1) Field of the Invention

The present invention is directed to connections for joining inflatable structures to rigid structures.

2) Description of the Prior Art

Known as soft-to-hard goods connections to those skilled in the art; these load-carrying structural joints require consideration of the elastic stiffness imbalances that exist between soft and rigid components as well as their relative motions when assembled. Furthermore, rigid components can transfer bending moments while inflatable components are made from thin flexible skins such as fabrics or sheet films that behave as membranes. Membranes do not possess bending and in-plane compression stiffnesses and therefore cannot transfer bending moments or in-plane compressive stresses.

Present connections operate with viscoelastic behaviors with an operational strain range of 0.01%-50.0% and a frequency range of 0.0 Hz to 5.0 KHz. Strains from externally applied loads are typically fully recoverable after removing the loads.

The skins of inflatable fabric structures are often made from textiles containing yarns spun from high performance fibers such as polyesters, aramids, liquid crystal polymers and hybridized yarns. The yarns are arranged in specific fabric architectures depending on the form factor of the inflatable component and the desired mechanical behavior when the component is inflated and subjected to external loads.

If the inflatable component does not contain a separate internal bladder; the fabrics are laminated with one or more layers of elastomeric material to provide an impermeable membrane. The membrane contains the internal pressurization media in a closed volume while preserving the ability of the inflatable components to achieve compact form factors when deflated. If internal bladders are required and depending upon the desired mechanical behaviors of the inflatable components; the fabrics may still be laminated for environmental protection (i.e., wear, abrasion, puncture, ultra-violet light etc.) to the fibers. The pressurization media can be gas or a liquid.

The fiber and lamination layers are generally polymers that provide material damping. However, energy dissipation capacities beyond those attainable with polymer skin materials alone is generally insufficient for attenuating dynamic energies when the soft-to-hard goods connections are subjected to sea-state motions, wave slap, wind, mechanical shock and blast loading events. Additional energy dissipation sources are necessary and require additional localized devices or mechanisms (referred to as system damping) to minimize peak dynamic reaction forces to acceptable ranges in order to avoid the failure of the soft-to-hard goods connections.

SUMMARY OF THE INVENTION

The present invention discloses a structurally robust, deployable, and removable connection for mechanically joining inflatable soft structures to rigid host structures by using receivers having path geometries configured to accept and physically secure one or more chorded elements extending from the inflatable structure.

Further advantages of the present invention are peel stress mitigation and the positive locking benefits achieved by the nested designs, the shock isolation, damping, and friction dissipation performances of the viscoelastic receivers for mitigating reaction forces from dynamic and cyclic loading events. The inventive connection enables the removal of the inflatable structure from the rigid host structure.

The soft-to-hard goods connector includes an elastomeric bladder with a preform layer and an outer textile layer enclosing the preform layer. The outer textile layer includes skin extension layers extending beyond a periphery of the elastomeric bladder. The connector includes a rigid host structure having a receiving component.

The skin extension layers have a chord attached at a distal end of the extension layers. The receiving component has a mounting track with the chord mounted in the mounting track. The receiving component permits the chord to rotate about a longitudinal axis with a limited range of motion.

According to another embodiment of the invention, a mechanical locking device for soft-to-hard connections includes a rigid structure and a receiving component connected to the structure. The receiving component includes a mounting track in the receiving component. The chord is removably engaged with the mounting track. The diameter of the chord is oversized with respect to the opening of the mounting track.

The present invention provides novel connections: for use in joining inflatable structures to rigid structures; to optimize stiffnesses and load transfer paths across the connections; and includes energy dissipation and shock mitigation mechanisms necessary to support a variety of dynamic loading conditions.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
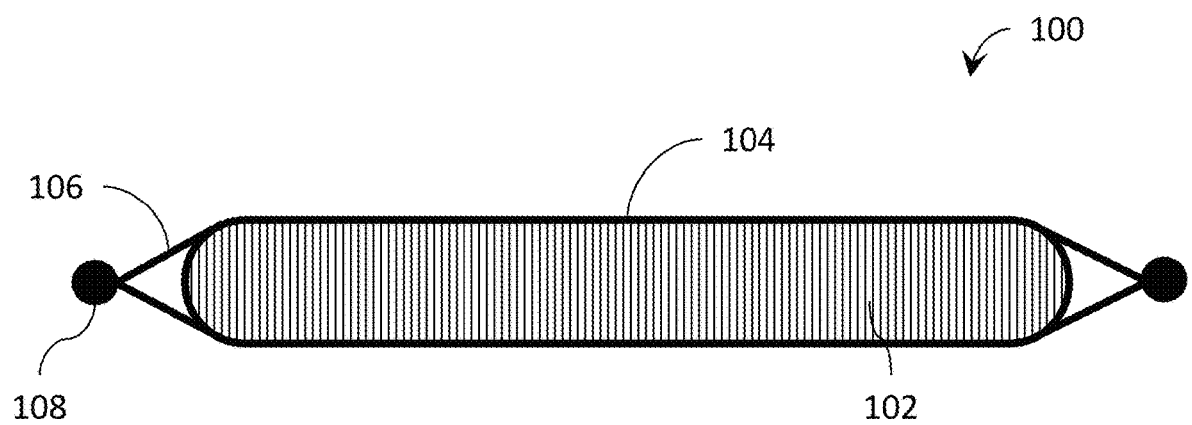
FIG. 1 is a cut-away view of a soft body package of the present invention.

Referring to the drawings, FIG. 1 depicts an elastomeric bladder 100. The elastomeric bladder 100 includes a preform layer 102 having an outer textile strength layer 104. A plurality of skin extension layers 106 extend beyond a periphery of the elastomeric bladder 100. The skin extension layers 106 have a chord 108 attached at a distal end of the skin extension layers. The chord 108 is perpendicular to the skin extension layers 106.

Figure 2:
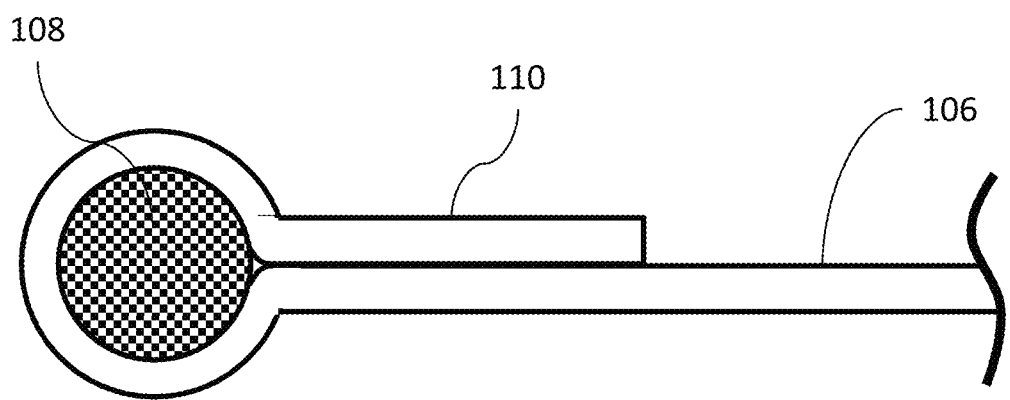
FIG. 2 is a cut-away view of a chord with a fabric skin extension layer of the soft body package.

FIG. 2 depicts an enlarged view of the skin extension layer 106. The skin extension layer 106 is made from fabrics, composites, or other structural materials. Typically, the skin extension layer 106 is a fabric piece attached to the outer textile strength layer 104. The chord 108 is constructed of polymer cordage, but the chord can also be a metal wire cable, polymer rod, or other material. In use, the skin extension layer 106 wraps around the chord 108 and an overlap region 110 is stitched, bonded, RF-welded, riveted or otherwise fastened back to the skin extension layer.

Figure 3:
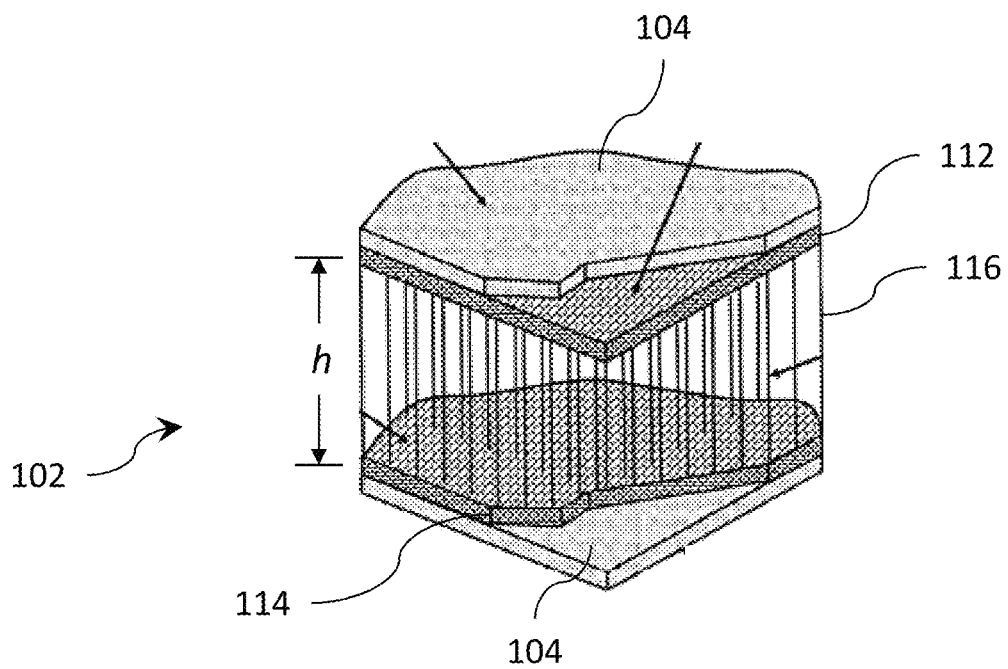
FIG. 3 is a cut-away view of a preform layer of the soft body package.

Referring to FIG. 3, the preform layer 102 may be made of a drop stitch fabric that is woven with a complex weaving process. For example, the preform layer 102 includes a top panel 112 and a bottom panel 114. Each of the top panel 112 and the bottom panel 114 is made of a woven fabric with a plurality of drop yarns 116 periodically and alternately dropped between the top panel and the bottom panel; thereby, creating an offset distance "h" between the top panel and the bottom panel. The preform layer 102 has the outer textile strength layer 104 laminated external to the top panel 112 and the bottom panel 114. As shown in FIG. 1, the preform layer 102 is sealed along the edges and configured to enclose a pressurized medium such as air to create flat planar shapes upon inflation. Such a preform layer 102 behaves as a structural sandwich panel subject to bending loads.

Figure 4:
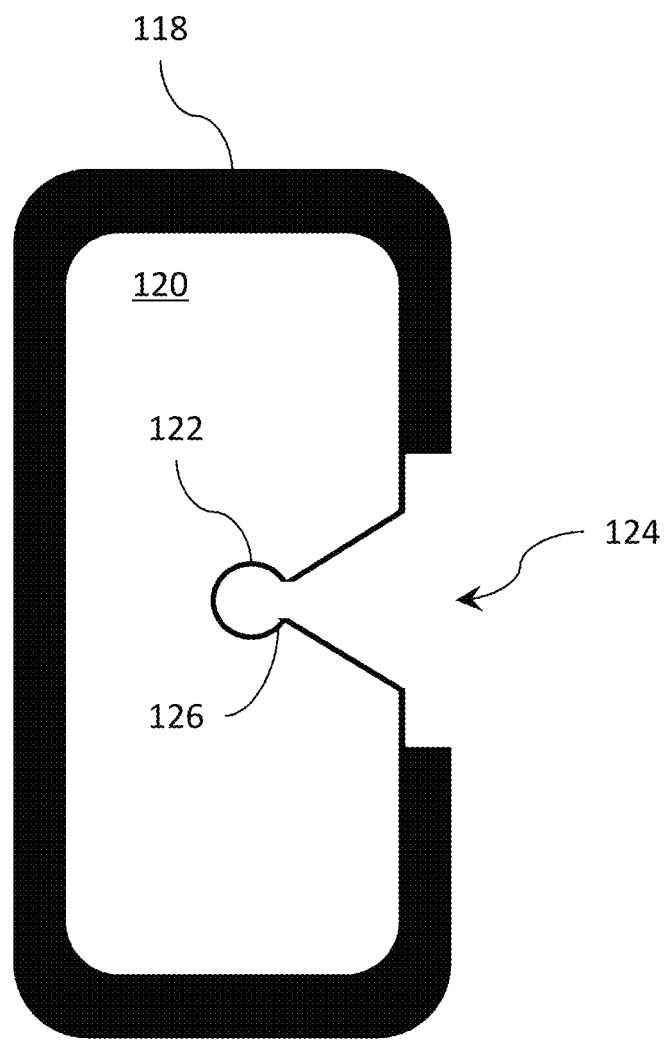
FIG. 4 is a cut-away view of a hard body portion of the present invention.

FIG. 4 depicts a cut-away view of a rigid structure 118. The rigid structure 118 includes a receiving component 120. The receiving component 120 provides a rigid interface to join the elastomeric bladder 100 to the rigid structure 118. The rigid structure 118 and the receiving component 120 allow for installation and removal of the elastomeric bladder 100 when not inflated to/from the structure.

The receiving component 120 has a mounting track 122. The mounting track 122 is a hollow channel within the receiving component 120 and is substantially circular in cross-section. For complex 3-D geometries of the rigid structure 118, the cross section of the receiving component 120 may be swept along a straight or curvilinear path depending upon the shape and orientation requirements of the rigid structure. The receiving component 120 has an opening or locking groove 124 that extends to the mounting track 122. The chord 108 is removably engaged with the mounting track 122. The opening 124 permits the chord 108 to rotate about a longitudinal axis of the chord with a limited range of motion. The diameter of the chord 108 is oversized with respect to the opening 124 that extends into the mounting track 122 such that an interference fit is formed against an open side 126 of the mounting track.

Figure 5:
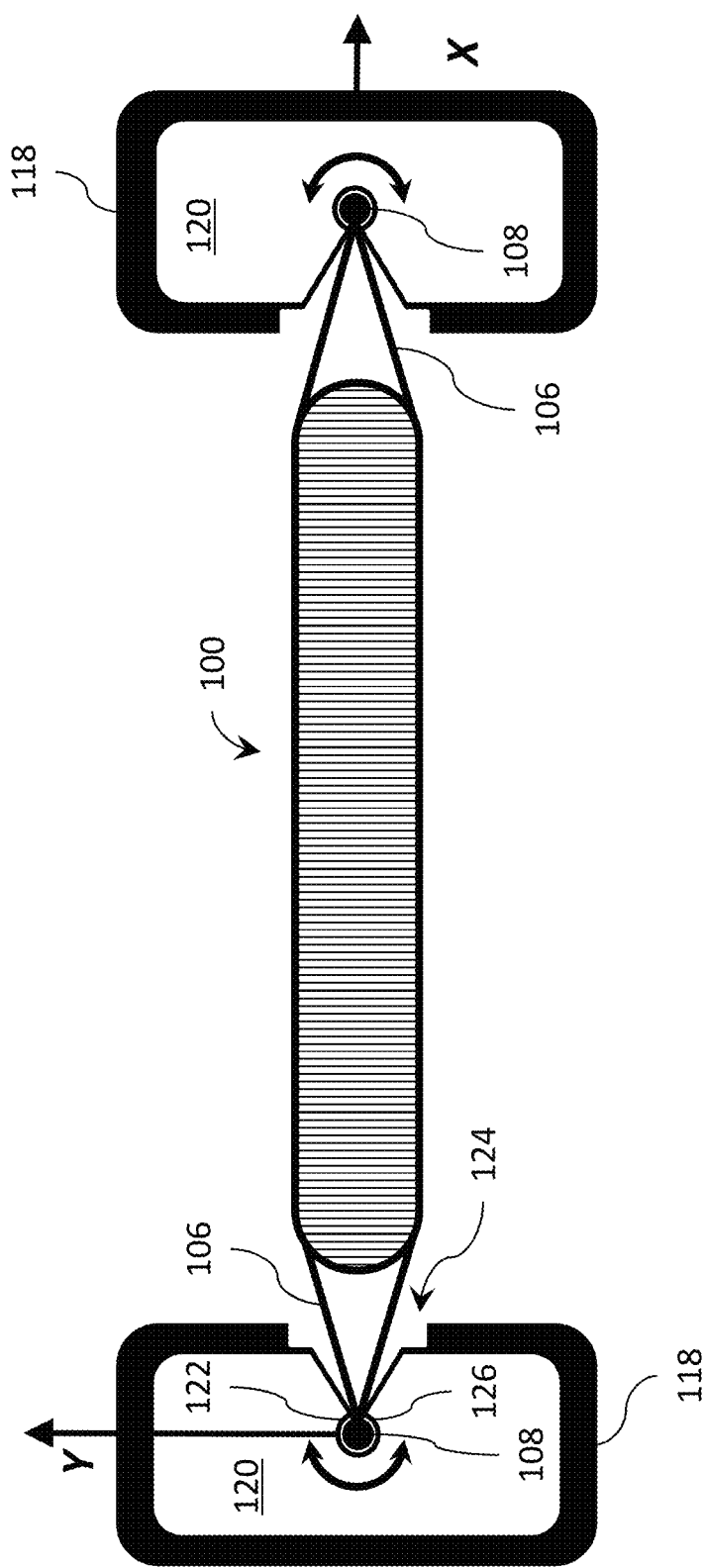
FIG. 5 is a side view of a single-chorded connection.

FIG. 5 depicts a side view of a single-chorded connection of an elastomeric bladder 100 to the rigid structure 118. In the figure, the upper and lower skin extension layers 106 connect to a single chord 108 on each end of the elastomeric bladder 100. The chord 108 is secured within the mounting track 122 by the interference fit against the side 126 of the mounting track but can rotate with a limited range of angular motion.

Figure 6:
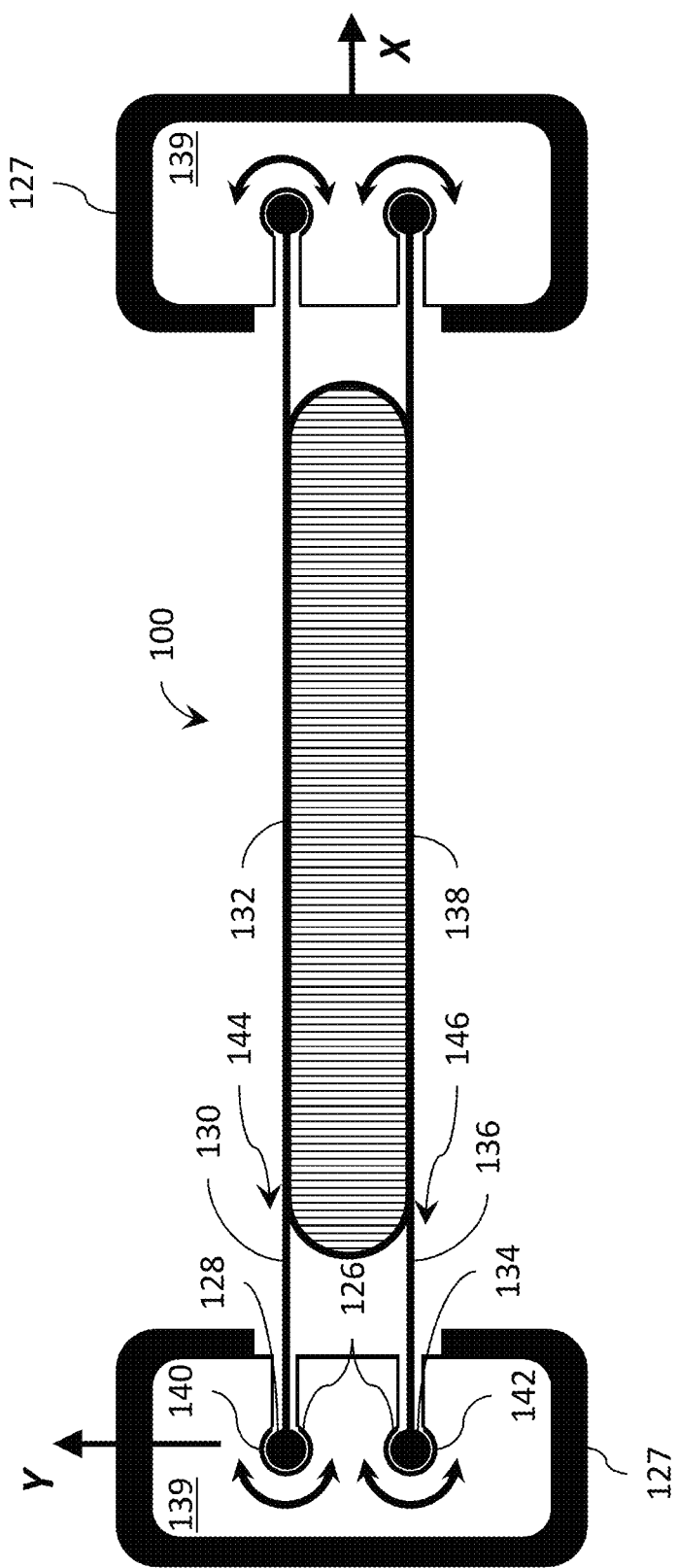
FIG. 6 is a side view of a double-chorded connection.

FIG. 6 depicts a double-chorded connection of the elastomeric bladder 100 to a host rigid structure 127. In the figure, first and second skin extension layers each connect to separate chords. A first chord 128 attaches at a distal end of a first skin extension layer 130 extending from a top 132 of the elastomeric bladder 100. A second chord 134 attaches at a distal end of a second skin extension layer 136 extending from a bottom 138 of the elastomeric bladder.

The host rigid structure 127 includes a receiving component 139. The receiving component 139 is a rigid interface to join the elastomeric bladder 100 to the rigid structure 127. The receiving component 139 has a first mounting track 140 and a second mounting track 142. The first mounting track 140 is vertically aligned with the second mounting track 142. As in FIG. 5, both the first mounting track 140 and the second mounting track 142 are hollow channels within the receiving component 139 and are substantially circular in cross-section. Each of the first chord 128 and the second chord 134 can be removably engaged with the respective first mounting track 140 and second mounting track 142. The receiving component 139 has gap openings 144, 146 that extend to the first mounting track 140 and the second mounting track 142, respectively. The gap openings 144, 146 permit the first chord 128 and the second chord 134 to rotate about a longitudinal axis with a limited range of motion.

The diameter of the first chord 128 and the second chord 134 may be the same. Each diameter is oversized with respect to the openings 144, 146 such that an interference fit forms for the first chord 128 and the second chord 134 against the open side 126 of the respective first mounting track 140 and second mounting track 142. The first chord 128 and the second chord 134 secure within the first mounting track 140 and second mounting track 142, respectively, of the receiving component 139 but are free to rotate within the respective first mounting track 140 and second mounting track 142 with a limited range of angular motion.

The receiving component 139 may be machined, 3-D printed, extruded, pultruded, cast, etc. from a variety of materials including metals, plastics, composites, etc. For complex 3-D geometries, the X-Y cross sections of the receiving component 139 may be swept along straight or curvilinear paths depending upon the shape and orientation requirements of the host rigid structure 127 to form mounting tracks that can be continuous or discontinuous.

Referring again to FIG. 3, the woven top panel 112 and the bottom panel 114 of the preform layer 102 complete the same function as the metal skins of a sandwich panel by providing resistance to bending and in-plane tension loads. The air-inflated volume of the preform layer 102 using such a drop stitch panel together with the transverse fibers (i.e., the drop yarns 116) positioned between the top panel 112 and the bottom panel 114 behave as the core of a rigid sandwich panel to resist transverse shear loads while maintaining the separation distance, h, between the mid-planes of the layers of the top panel and the bottom panel.

The bending and shearing stiffnesses of the inflated preform layer 102 are functions of internal pressure "$P_i$", separation distance "h", and the elastic modulus of the fabric skins "$E_{fabric}$". The $E_{fabric}$ corresponds to the elastic modulus of the fabric about the pretensioned (inflated) state and is generally nonlinear with pressure. The fabric skins can only support in-plane tension stresses. However, the fabric skins have the capacity to support externally applied in-plane compression loads if the pretensions developed in the fabric skins are sufficient to offset the applied in-plane compression loads. Once the superposition of the externally applied compression loads and pretensions from inflation results in a net zero stress state; the onset of wrinkling has occurred and the inflatable structure begins to lose stiffness upon further loading.

The effective transverse shear stiffness "Gt", of an inflated preform layer 102 subject to bending loads is dependent on $P_i$ but is not a material property. The effective transverse shear stiffness is a system property resulting from the thermodynamic behavior of the enclosed air. A fixed mass of air in the presence of transverse shearing deformations will experience a reduction in volume leading to an increase in $P_i$. This leads to thermodynamic work done on the air known as "PV work" as calculated by Equation (1). Prior research has shown that for air-inflated drop stitch panels subjected to bending and transverse shear stresses; Gt is an order of magnitude greater than $P_i$.

$$PV_{work} = \int_1^2 PdV + \int_1^2 VdP \quad (1)$$

where subscript 1 and superscript 2 represent the inflated and externally loaded states, respectively. P is the internal pressure of the air and V is the volume of air.

The energy balance that must be satisfied for the air-inflated drop stitch panel (preform layer 102) going from the inflated state-1 to an externally loaded static bending state-2 is given by Equation (2):

$$Work_{Done} = \int_1^2 F\delta = \Delta E_{internal} = \Delta E_{strain} + \int_1^2 PdV + \int_1^2 VdP + \Delta E_{dissipation} \quad (2)$$

where "$Work_{Done}$" is the total work done on the drop stitch panel; "$\delta$" is the displacement along the direction of an applied force "F"; "$\Delta E_{internal}$" is the change in internal energy from inflated state-1 to the loaded state-2; "$\Delta E_{strain}$" is the change in strain energy from inflated state-1 to the loaded state-2; and "$\Delta E_{dissipation}$" is the energy dissipated from inflated state-1 to the loaded state-2.

Increasing the separation distance h between midplanes of the top panel 112 and the bottom panel 114 is effective for increasing the bending stiffness of the drop stitch panel, noted as "$E_{fabric}$" and is achieved by the third term in the brackets of Equation (3). This term results from the Parallel Axis Theorem which computes the second area moment of inertia "I" of the separated arrangement of the drop stitch panel skins according to the bracketed term:

$$E_{fabric}I = E_{fabric}\left[\frac{bt_{upper\_skin}^3}{12} + \frac{bt_{lower\_skin}^3}{12} + Ah^2\right] \quad (3)$$

where "$E_{fabric}I$" is the bending stiffness (product of $E_{fabric}$ and I) of the panel; "b" is the width of the panel; "$t_{upper\_skin}$" and "$t_{lower\_skin}$" are the upper and lower fabric skin thicknesses, respectively; and "A" is the sum of the upper and lower fabric skin cross sectional areas.

It is important to note that $E_{fabric}$ is often nonlinear with inflation pressure and is a function of the ratio of biaxial tensions along the warp and weft axes of the top panel 112 and the bottom panel 114.

Load-carrying connections between a drop stitch panel and a rigid structure are ideally constructed when the skin mid-plane separation distance h, is preserved across the connections. This maximizes the load transferred from the panel to the rigid structure and minimizes the bending deflection of the drop stitch panel.

Figure 7:
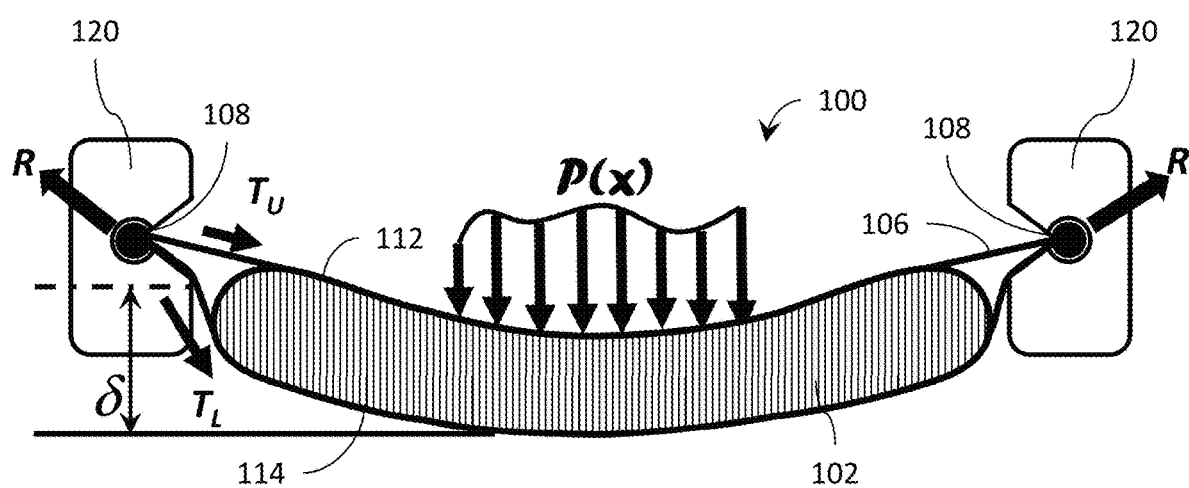
FIG. 7 is a side view of the single-chorded connection under load.
Figure 8:
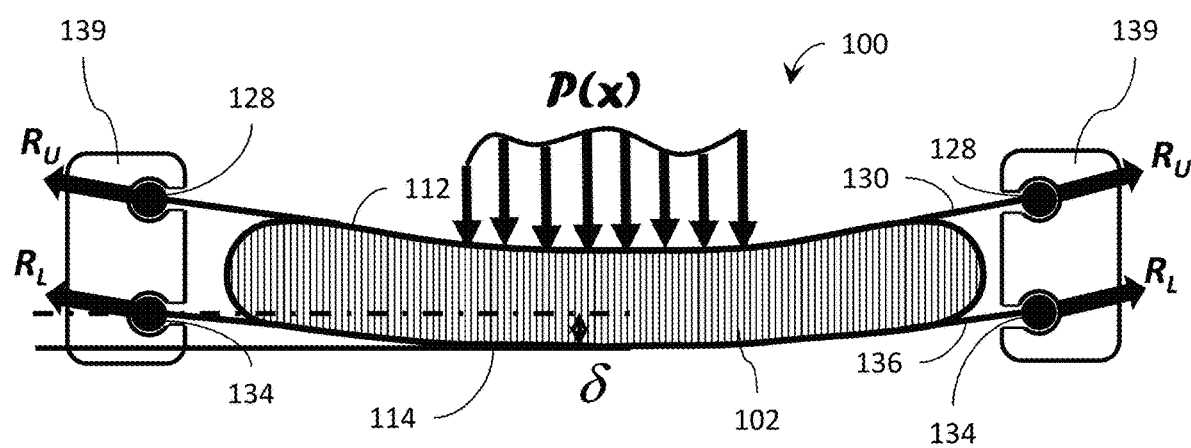
FIG. 8 is a side view of a double-chorded connection under load.

FIG. 7 and FIG. 8 depict soft-to-hard goods connections for the inflated elastomeric bladder 100 subject to a distributed bending load "P(x)". In FIG. 7, both connections are configured with chords 108 attached to skin extension layers 106 affixed to the top panel 112 and the bottom panel 114 and receiving components 120 attached to the host rigid structure 118. The receiving components 120 are rigid interfaces that join the inflated elastomeric bladder 100 to the rigid structure 118 (not shown to avoid clutter). The receiving components 120 allow for installation and removal of the elastomeric bladder 100 when not inflated to/from the rigid structure 118. The receiving components 120 permit the chords 108 to rotate about the longitudinal axes of the chords with a limited range of motion.

The chords 108 are secured within the mounting tracks 122 of the receiving component 120 but are free to rotate within the mounting tracks with a limited range of angular motion. The chords 108 can only transfer tensile forces between the elastomeric bladder 100 and the host rigid structure 118 (i.e., bending moments cannot be transferred) if the skin extension layers 106 are membranes. Otherwise, compression and bending loads can also transfer from the skin extension layers 106 to the receiving components 120.

The diameter of the chord 108 is oversized with respect to the opening of the mounting track 122 such that an interference fit is formed. In FIG. 7, a single chord design is shown whereby skin extension layers 106 from both the top panel 112 and the bottom panel 114 connect to a single chord 108 on each end of the elastomeric bladder 100 that is connected to a host rigid structure 118.

In FIG. 8, a double-chord design has a skin extension layer 106 from the top panel 112 and the bottom panel 114 connected to separate chords at each end of the elastomeric bladder 100. The double-chord arrangement maintains the mid-plane separation distance, h, across the connection. The top panel 112 of the single-chord arrangement shown in FIG. 7 does not develop tension until after the elastomeric bladder 100 deflects below the elevation of the single-chord connection while the bottom panel 114 develops tension immediately upon loading. This results in a nonlinear load-deflection behavior of the elastomeric bladder 100. The lower skin tension $T_L$ always exceeds the upper skin tension $T_U$ provided both skin extension layers 106 are of the same material and thickness.

Figure 9:
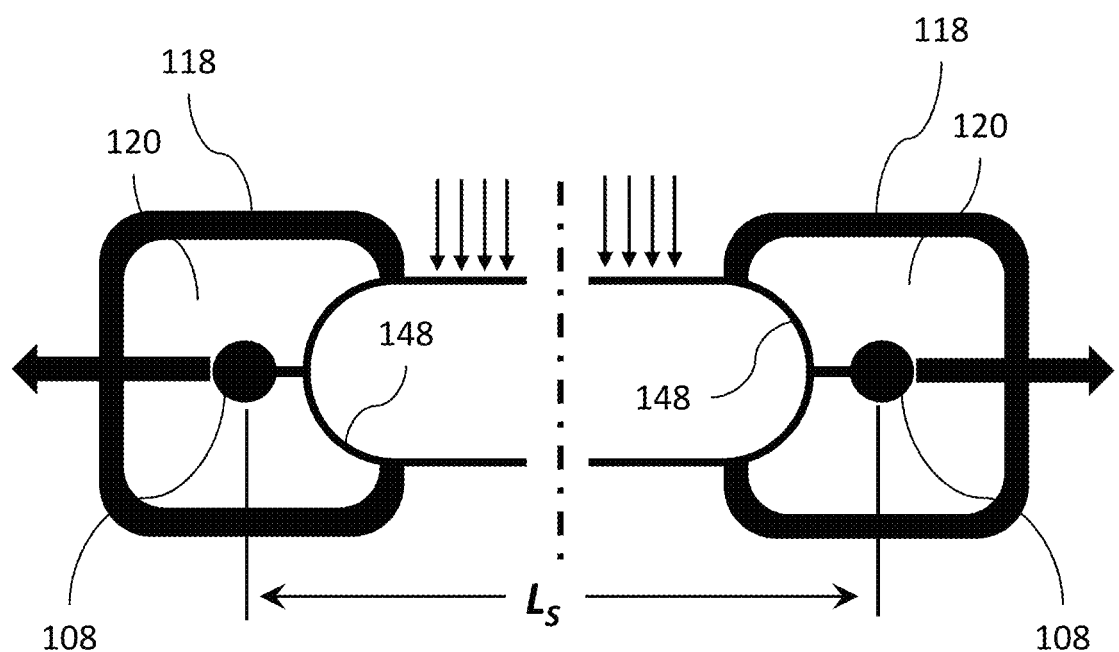
FIG. 9 is a side view of a nested single-chorded connection.
Figure 10:
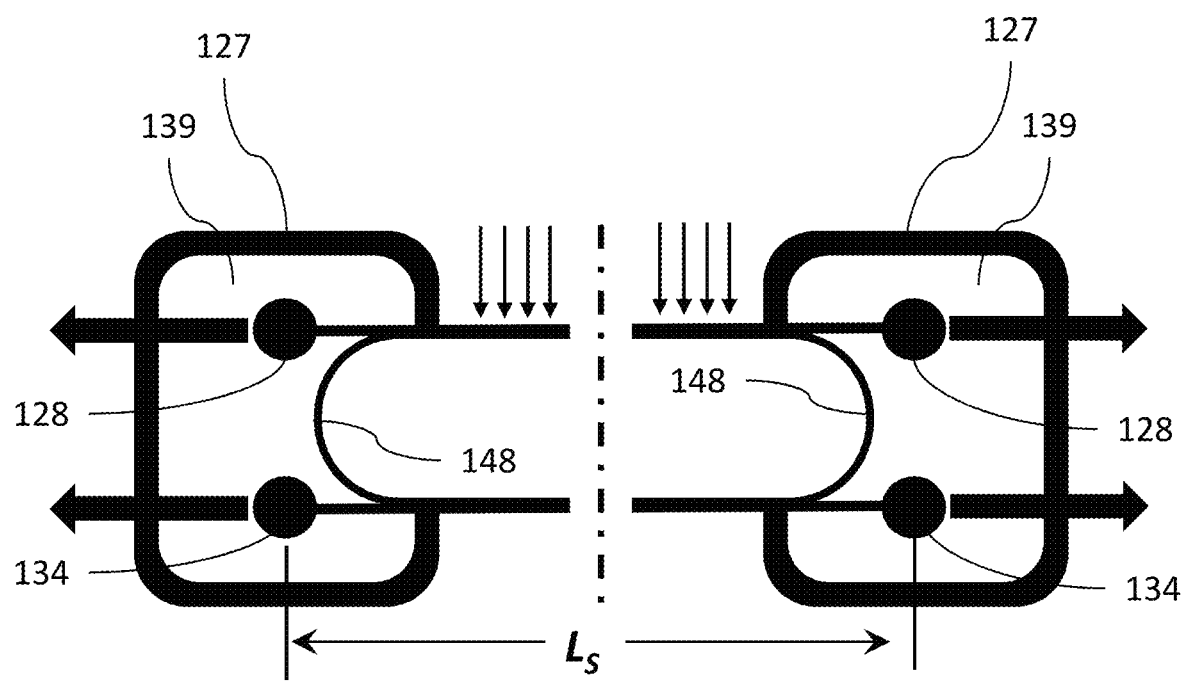
FIG. 10 is a side view of a nested double-chorded connection.

FIG. 9 and FIG. 10 depict alternative designs of the single-chord and double-chord connections to provide additional securing performance against transverse loadings. The receiving component 120 in FIG. 9 and the receiving component 139 in FIG. 10 include a concave surface 148. At least a portion of the periphery of the elastomeric bladder 100 (i.e., the outer edges) can nest within the concave surface 148 of the receiving components 120, 139.

Nesting is a simple mechanism that offers additional positive-locking performance which increases with increasing inflation pressure. However, care must be taken to ensure that the spacing "$L_s$" between opposite connections does not restrict the lateral extensibility of the elastomeric bladder 100 during inflation; otherwise, the elastomeric bladder may not fully develop the maximum skin tensions achievable for the desired inflation pressure. The nested connection shown in FIG. 9 and FIG. 10 reduces the rotation and deflections of the elastomeric bladder 100 and eliminates the possibility for delamination failures resulting from peel stress effects.

In another embodiment, the material of the receiving components 120, 139 can be selected to create additional damping beyond that achieved by the inflatable fabric structure material. For example, the receiving components 120, 139 can be made using viscoelastic materials (i.e., rubber, thermoplastic urethane (TPU), polyurea, etc.) having appreciable damping and rate-dependent and frequency-dependent mechanical properties.

The receiving components 120, 139 can be tuned to provide additional energy dissipation sources as needed to reduce peak reaction forces at the connections; the benefits of which will be of foremost value for inflatable structures subject to dynamic and cyclic loads. The frequency-dependent viscoelastic properties of the receiving component 120 can be leveraged to alter the dynamic modal behaviors of the elastomeric bladder 100. For a viscoelastic solid subjected to the harmonic shearing function of Equation (4); the material stiffness properties are governed by the storage modulus in shear, G', and the damping performance is governed by the loss modulus in shear, G".

$$\gamma(t)=\gamma_0 \sin \omega t \tag{4}$$

where: "$\gamma(t)$" is the shearing strain at time t; "$\gamma_0$" is the amplitude of the shearing strain; and "$\omega$" is the frequency of loading in radians/sec.

The storage and loss moduli are related by the linear viscoelastic stress-strain law of Equation (5).

$$\sigma(t)=\gamma_0[G'(\omega)\sin(\omega t)+G''(\omega)\cos(\omega t)] \tag{5}$$

where "$\sigma(t)$" is the stress at time "t".

The loss angle is defined by $\varphi=\tan^{-1}(G''/G')$. The complex modulus, G* combines the storage and loss moduli in shear as shown by Equation (6):

$$G^*=G'+iG'' \tag{6}$$

When subject to dynamic and fatigue loads, the work done on the system is converted to a combination of strain energy and heat with the latter being a form of energy dissipation through hysteresis. The energy dissipated per loading cycle and unit volume of material is equal to the area in the hysteresis loop.

For a viscoelastic material subject to cyclic pure shear, the energy dissipated per unit volume per cycle is given by Equation (7):

$$D = \int_0^{2\pi\omega} \sigma\left(\frac{d\gamma}{dt}\right)dt \tag{7}$$

Using Equation (4) and Equation (5); the dissipated energy "D" can be expressed as shown by Equation (8):

$$D = \int_0^{2\pi\omega} \gamma_0^2 \omega(G'\sin \omega t + G''\cos \omega t)\cos \omega t \, dt \tag{8}$$

which reduces to Equation (9):

$$D=\pi\gamma_0^2 G''(\omega) \tag{9}$$

Figure 11:
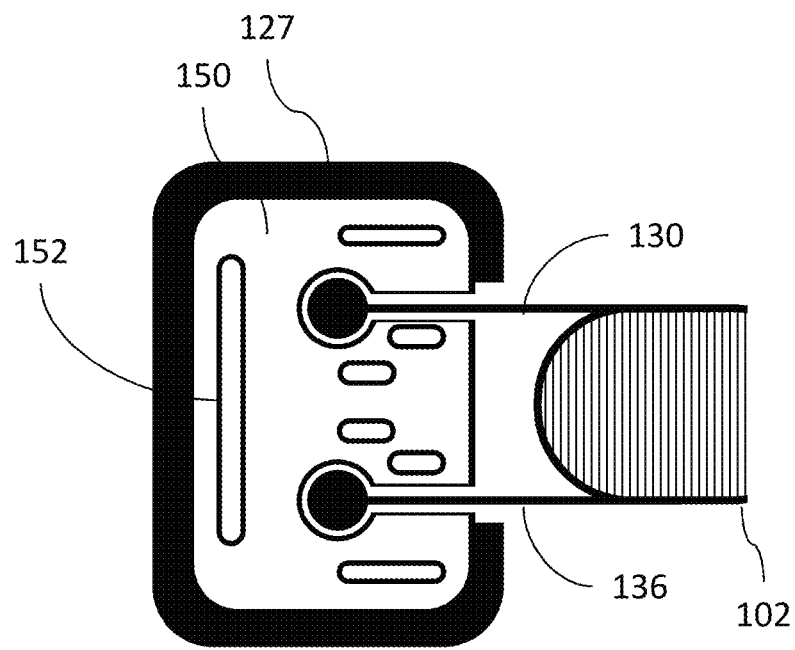
FIG. 11 is a side view of a double-chorded connection in a viscoelastic receiver.
Figure 12:
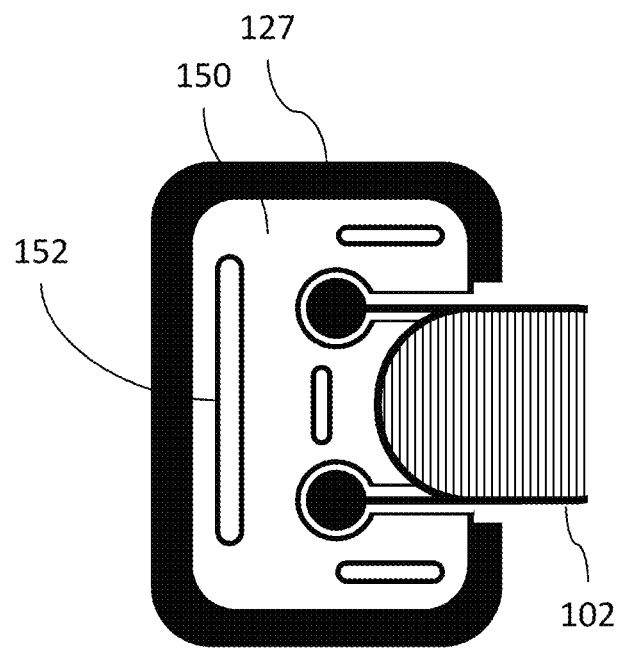
FIG. 12 is a side view of a nested double-chorded connection in a viscoelastic receiver.

FIG. 11 shows an offset double-chorded connection incorporating a viscoelastic receiver 150 partially encased in the rigid enclosure 127 and FIG. 12 shows a nested double-chorded connection incorporating a viscoelastic receiver 150 partially encased in the rigid enclosure 127. The viscoelastic receivers 150 are partially encased in a rigid enclosure (structural shell) 127 to contain the viscoelastic material. This permits finite relative motions of the chords 130, 136 and the viscoelastic receivers 150 contained within the rigid enclosures 127. A further energy dissipation source may be included by adding cutout features, such as slotted apertures 152 or holes (slots) in the viscoelastic receivers 150. The slotted apertures 152 serve to selectively control the stiffness of the receiver 150; to promote finite relative motions; and to produce contacting surfaces within the viscoelastic material in order to maximize energy dissipation through friction.

Figure 13:
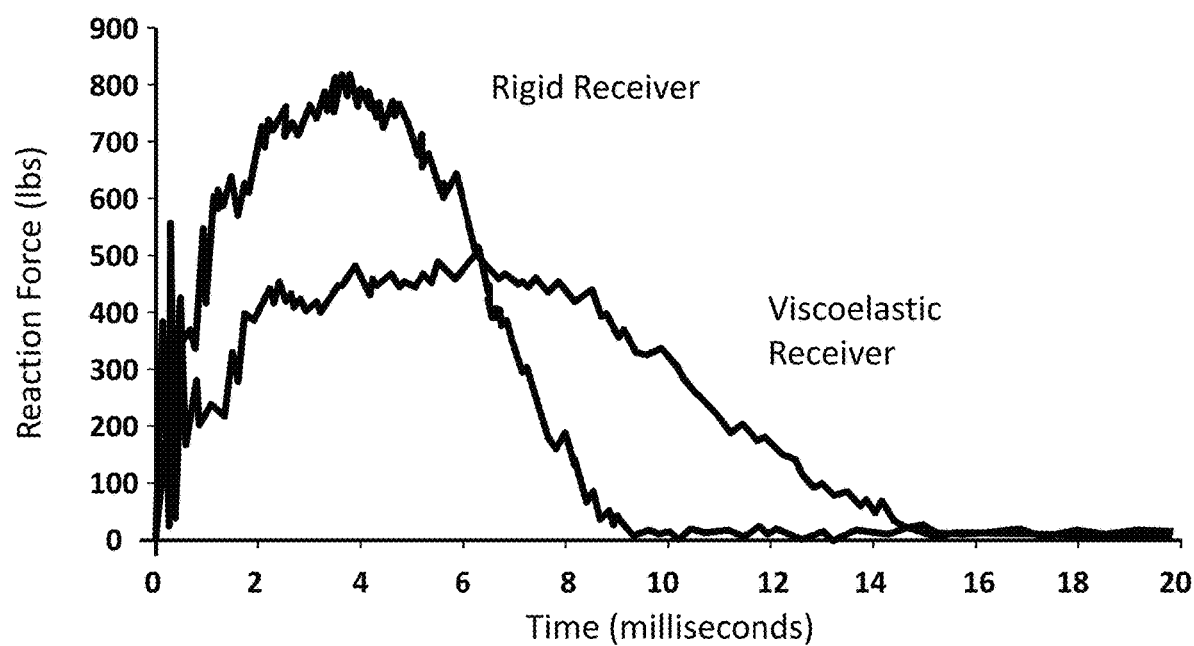
FIG. 13 is a graph of reaction force.

Consider the behavior of a viscoelastic receiver connection with material softening subject to a mechanical shock loading event. FIG. 13 is a graph showing a comparison of reaction forces for rigid and viscoelastic receivers subject to mechanical shock load. The relative compliance and viscoelastic softening of the receiver 150 reduces the peak reaction force by extending the time duration of loading.

The advantages and new features achieved by the present invention include structurally robust, deployable and removable connection designs for mechanically joining inflatable soft structures such as drop stitch fabric panels to rigid host structures using continuous or discontinuous rigid or viscoelastic receivers having linear or curvilinear longitudinal path geometries configured to accept and physically secure one or more chorded elements extending from the inflatable structure. Further advantages of these designs are the peel stress mitigation and positive locking benefits achieved by the nested designs, the shock isolation, damping, and friction dissipation performances of the viscoelastic receivers for mitigating reaction forces from dynamic and cyclic loading events including sea state motions, wave slap, wind, vibration, mechanical shock, blast overpressure, etc. The inventive connection designs enable the removal of the inflatable structure from the rigid host structure and allow the inflatable structure to be stowed in a compact form factor when not in use.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A soft-to-hard goods connector comprising:
   an elastomeric bladder with a preform layer, an outer textile layer enclosing said preform layer with said outer textile layer having at least one skin extension layer extending beyond a periphery of said elastomeric bladder wherein said at least one skin extension layer has a chord attached at a distal end with said chord being perpendicular to said at least one skin extension layer; and
   at least one host structure with a receiver of viscoelastic material having slotted apertures therethrough with said viscoelastic material partially encased in a rigid disclosure and wherein said at least one host structure includes a mounting track with said chord mountable in said mounting track;
   wherein said at least one host structure permits said chord to rotate about a longitudinal axis of said chord with a limited range of motion;
   wherein said slotted apertures in said viscoelastic material allow selective control of stiffness within said receiver to promote finite relative motions and produce contacting surfaces within said viscoelastic material in order to maximize energy dissipation through friction.

* * * * *